United States Patent [19]
Tamori

[11] Patent Number: 5,079,949
[45] Date of Patent: Jan. 14, 1992

[54] SURFACE PRESSURE DISTRIBUTION DETECTING ELEMENT

[75] Inventor: Teruhiko Tamori, Iruma, Japan
[73] Assignee: Enix Corporation, Tokyo, Japan
[21] Appl. No.: 598,290
[22] Filed: Oct. 16, 1990
[30] Foreign Application Priority Data Jul. 6, 1990 [JP] Japan .................................. 2-179735

[51] Int. Cl.$^5$ ............................................. A61B 5/103
[52] U.S. Cl. .................................... 73/172; 73/865.7; 338/99
[58] Field of Search ................... 73/172, 865.7, 862.07, 73/774, 775, 776, 781; 340/665; 338/99; 128/774

[56] References Cited

U.S. PATENT DOCUMENTS

| | | | |
|---|---|---|---|
| 3,850,034 | 11/1974 | Tsuchiya et al. | 73/172 |
| 4,492,949 | 1/1985 | Peterson et al. | 338/99 X |
| 4,570,149 | 2/1986 | Thornburg et al. | 338/99 X |
| 4,644,801 | 2/1984 | Kustanovich | 73/172 X |
| 4,734,034 | 3/1988 | Maness et al. | 73/865.7 X |
| 4,856,993 | 8/1989 | Maness et al. | 338/99 X |

FOREIGN PATENT DOCUMENTS 0208734  8/1988  Japan .................................. 73/865.7

Primary Examiner—William A. Cuchlinski, Jr.
Assistant Examiner—G. Bradley Bennett
Attorney, Agent, or Firm—Townsend and Townsend

[57] ABSTRACT

A detecting element for sensing surface pressure distributions comprising a substantially rigid insulating substrate, a plurality of scanning row electrodes, formed by metal deposition on said substrate, etched to form a pattern of substantially parallel electrodes which are spaced apart and oriented along a first axis, a thin resistive film, deposited on said substrate, having a resistance which varies as a function of contact area, a substantially resilient deformable surface layer, a plurality of scanning column electrodes, formed by metal deposition on said surface layer, etched to form a pattern of substantially parallel column electrodes which are spaced apart, said surface layer being bonded to said substrate by an anisotropic adhesive so that said column electrodes are oriented along a second axis which is perpendicular to said first axis, said surface layer transmitting pressure distribution to said row electrodes, resistive film, and column electrodes to form a matrix of variable contact resistances to provide analog information relating to the distribution of surface pressure applied to said surface layer.

10 Claims, 2 Drawing Sheets

SURFACE PRESSURE DISTRIBUTION DETECTING ELEMENT

BACKGROUND OF THE INVENTION

1. Field of the Invention

The present invention relates to a surface pressure distribution detecting element for use in detection of a minute surface pressure distribution such as a fingerprint.

2. Description of the Prior Art

According to known conventional methods of measuring the two-dimensional distribution of a load acting on a surface of an object, a large number of load cells or electrode pairs are arranged in a matrix form, and these elements are scanned (e.g., Japanese Unexamined Patent Publication (Kokai) Nos. 62-71828 and 62-226030). These methods are used to measure the distribution of a load or pressure acting on a seat of a vehicle or a fingertip of a robot.

In these methods, an element such as a load cell or an electrode pair has a relatively large size. Therefore, the methods can be suitably used to measure a two-dimensional pressure distribution on the above-mentioned object. However, they are not suitable for measurement of a pressure distribution on a high-density portion such as a fingerprint having four epidermal ridges per millimeter.

Under these circumstances, the present inventor proposes a detecting device in Japanese Unexamined Patent Publication (Kokai) No. 63-310087. In this device, a pressure-sensitive sheet as of conductive rubber whose resistance is changed in accordance with an applied pressure is used to measure a minute surface pressure distribution such as a fingerprint, and changes in resistance based on the pressure distribution are extracted by electrical scanning.

In addition, a measuring device disclosed in Japanese Unexamined Patent Publication (Kokai) No. 62-226030 is known. In this device, a large number of electrode pairs are arranged to oppose each other in a matrix form. In this arrangement, when a pressure is applied to given electrode pairs, the intervals between the electrode pairs are changed. The capacitances formed by these electrode pairs are then changed. A pressure distribution is measured by detecting such changes in capacitance.

The present inventor manufactured a sample of the above-mentioned device, and conducted various experiments to detect a minute surface pressure distribution. As a result, it was found that the device required various elaborate techniques in manufacturing, and small pressure changes were difficult to detect with high precision. In addition to such practical problems, it was found that contact resistance, which can be substantially neglected on a macroscopic scale, could be very influential on a microscopic scale.

SUMMARY OF THE INVENTION

In consideration of such a contact resistance, the present inventor aims at providing a method of detecting a minute surface pressure distribution on the basis of changes in contact resistance. It is an object of the present invention to provide an element for detecting a minute surface pressure distribution with a simple arrangement. In order to achieve the above object, there is provided a surface pressure distribution detecting element constituted by a plurality of first scanning electrodes formed on an insulating substrate at small intervals, and a plurality of second scanning electrodes formed on the first scanning electrodes through resistance layers at small intervals in a direction perpendicular to that of the first scanning electrodes.

DETAILED DESCRIPTION OF THE PREFERRED EMBODIMENTS

The present invention will be described below with reference to the accompanying drawings.

Figure 1:
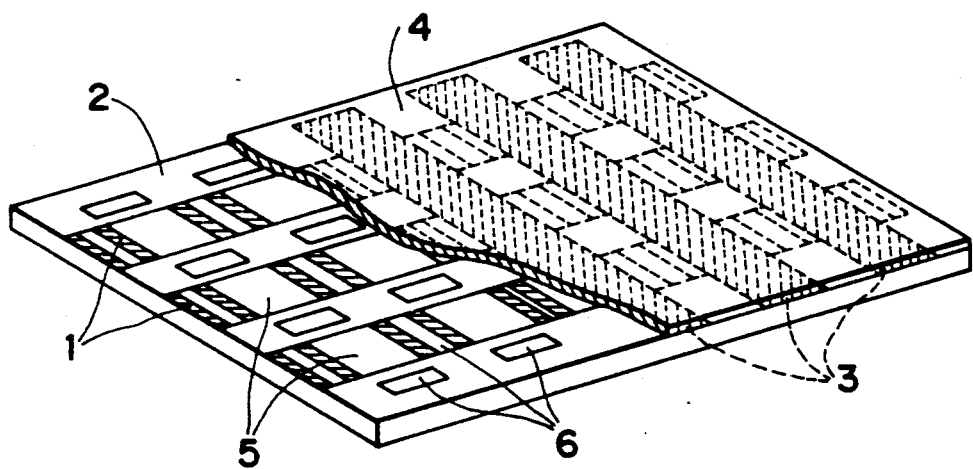
FIG. 1 is a partially cutaway perspective view showing a surface pressure distribution detecting element according to an embodiment of the present invention.

FIG. 1 shows a surface pressure distribution detecting element according to the an embodiment of the present invention. The surface pressure distribution detecting element is designed such that a layer 4 on which scanning electrodes 3 are formed in the Y-axis direction is bonded to a surface of an insulating substrate 2 on which scanning electrodes 1 are formed in the X-axis direction.

More specifically, a silver layer having a thickness of about 10 $\mu$m is formed on the entire surface of the ceramic substrate 2 having a thickness of 0.8 mm by deposition or sputtering, and the scanning electrodes 1 are formed in the X-axis direction by etching. The scanning electrode 1 has a width of, e.g., 60 $\mu$m, and the distance between the electrodes 1 is, e.g., 40 $\mu$m.

Subsequently, a thin film resistor having a thickness of about 2 $\mu$m is formed on the entire surface of the ceramic substrate 2, on which the scanning electrodes 1 are formed, by deposition, and resistance layers 5 are formed on the scanning electrodes 1 at equal intervals by photoetching. Each resistance layer 5 has a resistance of several 100 $\Omega$ to a few k$\Omega$ in the direction of thickness.

An oxide or tungsten dioxide layer is deposited on the entire surface of the ceramic substrate 2 to a thickness of about 7 $\mu$m, and spacers 6 are formed on the scanning electrodes 1 between the resistance layers 5 and are formed between the resistance layers 5 on the adjacent scanning electrodes 1 by photoetching.

Copper is deposited on an entire surface of a polyimide or polyester layer 4, and scanning electrodes 3 are formed on the layer 4 in the Y-axis direction by etching. The layer 4 is then bonded to the ceramic substrate 2 by using an anisotropic adhesive in such a manner that the scanning electrodes 3 are mounted on the resistance layers 5 on the ceramic substrate 2 so as to be perpendicular to the scanning electrodes 1. The width of each of the scanning electrodes 3 in the Y-axis direction and the interval therebetween are the same as those set for the scanning electrodes 1 in the X-axis direction. In this manner, the basic arrangement of the matrix-like surface pressure distribution detecting element is completed.

Figure 2:
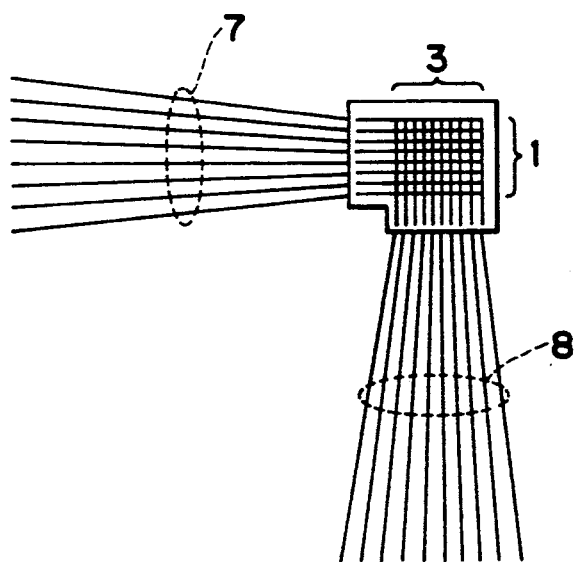
FIG. 2 is a view showing the surface pressure distribution detecting element in FIG. 1 together with wires.

FIG. 2 shows the detecting element manufactured in the above-described steps together with wires for extracting outputs. The scanning electrodes 1 in the X-axis direction are connected to wires 7, and the scanning electrodes 3 in the Y-axis direction are connected to wires 8.

Scan signals are sequentially supplied to the scanning electrodes 1 and 3 of the X- and Y-axis directions from an external circuit (not shown) through the wires 7 and 8 at predetermined timings.

A method of driving the detecting element, a driving circuit, and a pressure detecting circuit are irrelevant to the gist of the present invention and hence are not described in detail here. However, Japanese Patent Application No. 63-236212 as a prior invention by the present inventor may be incorporated herein as needed.

Assume that a fingerprint is to be detected by using the above-described detecting element. For example, the detecting element is formed as an element having an area of 2 cm ×2 cm. When a finger from which a fingerprint is to be detected is placed on the element (having an upper surface covered with a protective thin film), and the element is slightly depressed, the pressure acting on the element varies at positions corresponding to the ridges and recesses of the fingerprint pattern. Since the resistance layers 5 at the intersecting portions between the scanning electrodes 1 and 3 are depressed at the positions of the ridges, the corresponding contact resistances are small. In contrast to this, no pressure is applied to the resistance layers 5 at the positions of the recesses, the corresponding contact resistances are large.

Since the scan signals are sequentially applied to the scanning electrodes 1 and 3 at the predetermined timings, the contact resistances of the intersecting portions where the scan signals are simultaneously applied to the scanning electrodes 1 and 3 are converted into current signals and extracted to the external circuit. A fingerprint pattern can be discriminated by processing these signals.

Figure 3:
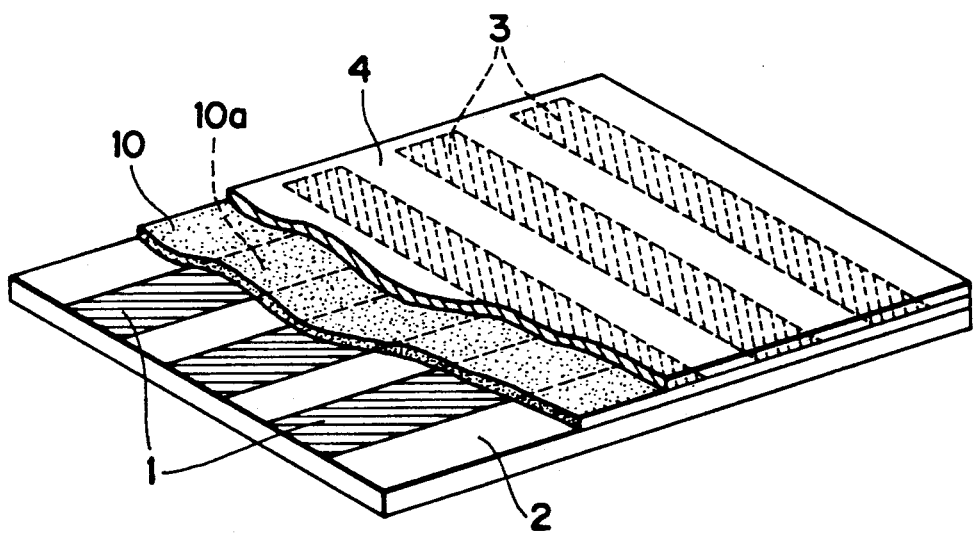
FIG. 3 is a partially cutaway perspective view showing a surface pressure distribution detecting element according to another embodiment of the present invention.

FIG. 3 shows a surface pressure distribution detecting element according to another embodiment of the present invention. The same reference numerals in FIG. 3 denote the same parts as in FIG. 1.

In the detecting element of this embodiment, silver scanning electrodes 1 are formed on a ceramic substrate 2 in the X-axis direction in the same manner as in the embodiment in FIG. 1, and an anisotropic resistance ceramic plate 10 having a lower surface on which silver scanning electrodes 10a are formed in the X-axis direction by deposition or the like is arranged on the upper surface of the ceramic substrate 2. A transparent layer 4 having a lower surface on which scanning electrodes 3 are formed in the Y-axis direction by deposition or the like is arranged on the upper surface of the anisotropic resistance ceramic plate 10 in such a manner that the scanning electrodes 3 are brought into contact with the plate 10.

Figure 4:
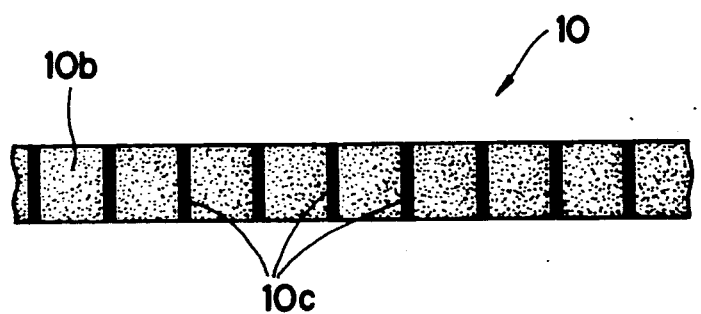
FIG. 4 is a sectional view of an anisotropic resistance ceramic plate used for the element shown in FIG. 3.

As shown in FIG. 4, the anisotropic resistance ceramic plate 10 is a resistance plate formed by separately embedding resistance bars 10c in a ceramic plate 10b having a thickness of about 2 mm at intervals of about 30 to 50 μm in the direction of thickness. The plate 10 has a resistance of 350 Ω per resistance bar. The intervals and resistances of the resistance bars 10b may be adjusted as needed.

In this manner, the basic arrangement of a matrix-like surface pressure distribution detecting element is completed. A method of driving this detecting element and a driving circuit therefor are the same as those in the embodiment in FIG. 1.

In the embodiment shown in FIG. 1, the resistance layers 5 are formed at only the intersecting portions between the scanning electrodes of the X- and Y-axis directions. However, they may be formed on the entire surface of the substrate.

The surface pressure distribution detecting element of the present invention is suitable not only for detection of a minute pattern such as a fingerprint but also for detection of an accurate pattern such as a seal impression or a signature.

As has been described above, according to the present invention, a surface pressure distribution detecting element is designed such that a plurality of first scanning electrodes are formed on an insulating substrate at small intervals, and a plurality of second scanning electrodes are formed on the first scanning electrodes at small intervals in a direction perpendicular to that of the first scanning electrodes. With this arrangement, a minute surface pressure distribution can be detected as changes in contact resistance of resistance layers. Therefore, a very simple element structure can be realized, and pressure changes can be accurately detected.

What is claimed is:

1. A detecting element for sensing surface pressure distributions comprising:
   a substantially rigid insulating substrate;
   a plurality of scanning row electrodes, formed by metal deposition on said substrate, etched to form a pattern of substantially parallel electrodes which are spaced apart and oriented along a first axis;
   a thin resistive film, deposited on said substrate, having a resistance which varies as a function of contact area;
   a substantially resilient deformable surface layer;
   a plurality of scanning column electrodes, formed by metal deposition on said surface layer, etched to form a pattern of substantially parallel column electrodes which are spaced apart, said surface layer being bonded to said substrate by an anisotropic adhesive so that said column electrodes are oriented along a second axis which is perpendicular to said first axis, said surface layer transmitting pressure distributions to said row electrodes, resistive film, and column electrodes to form a matrix of variable contact resistances to provide analog information relating to the distribution of surface pressure applied to said surface layer.

2. The detecting element of claim 1 wherein said substantially rigid insulating substrate layer comprises a ceramic layer.

3. The detecting element of claim 1 wherein said substantially resilient deformable surface layer comprises a polyimide layer.

4. The detecting element of claim 1 wherein said substantially resilient deformable surface layer comprises a polyester layer.

5. The detecting element of claim 1 wherein said metal deposition on said substrate to form said scanning row electrodes comprises silver.

6. The detecting element of claim 1 wherein said metal deposition on said substantially resilient deformable surface layer to form said scanning column electrodes comprises copper.

7. The detecting element of claim 1 wherein said thin resistive film is etched to form a resistive fill which remains only at points of intersection of said row and column electrodes.

8. The detecting element of claim 1 wherein a plurality of oxide spacers are formed by oxide deposition on said substrate and etched to form spacer islands at specified points.

9. The detecting element of claim 8 wherein said oxide spacers comprise tungsten dioxide.

10. A detecting element for sensing surface pressure distributions comprising:
   a substantially rigid insulating substrate;
   a plurality of scanning row electrodes, formed by metal deposition on said substrate, etched to form a pattern of substantially parallel electrodes which are spaced apart and oriented along a first axis;
   an anisotropic resistance ceramic plate, formed by separately embedding substantially rectangular resistance bars in a ceramic plate which are spaced apart and substantially parallel, said plate having a lower surface on which metal scanning electrodes are formed by deposition and etched and oriented along same said first axis as said scanning row electrodes;
   a substantially resilient deformable surface layer;
   a plurality of scanning column electrodes, formed by metal deposition on said surface layer, etched to form a pattern of substantially parallel column electrodes which are spaced apart, said surface layer being bonded to the upper surface of said anisotropic resistance ceramic plate by an anisotropic adhesive so that said column electrodes are oriented along a second axis which is perpendicular to said first axis, said surface layer transmitting pressure distributions to said row electrodes, antisotropic resistance ceramic plate, and column electrodes to form a matrix of variable contact resistances to provide analog information relating to the distribution of surface pressure applied to said surface layer.

* * * * *